Feb. 6, 1968

H. M. FRANKS 3,367,217

TAPER BORING OR TURNING TOOL UNIT

Filed Oct. 21, 1965

INVENTOR.
HUGH M. FRANKS
BY
ATTORNEYS

Feb. 6, 1968
H. M. FRANKS
3,367,217
TAPER BORING OR TURNING TOOL UNIT
Filed Oct. 21, 1965
2 Sheets-Sheet 2
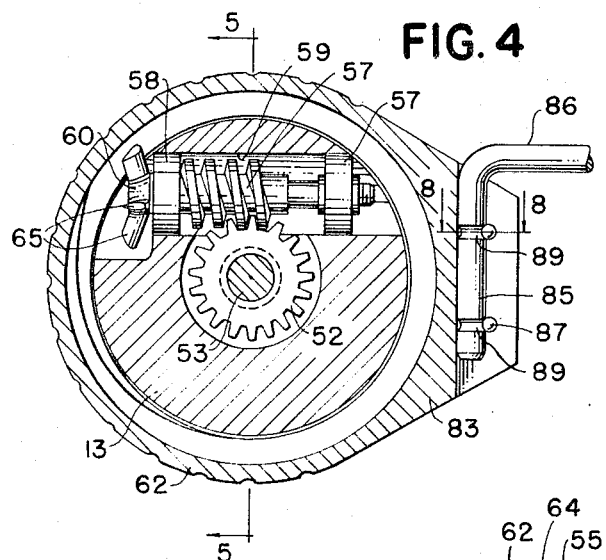
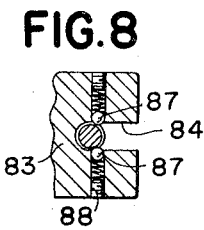
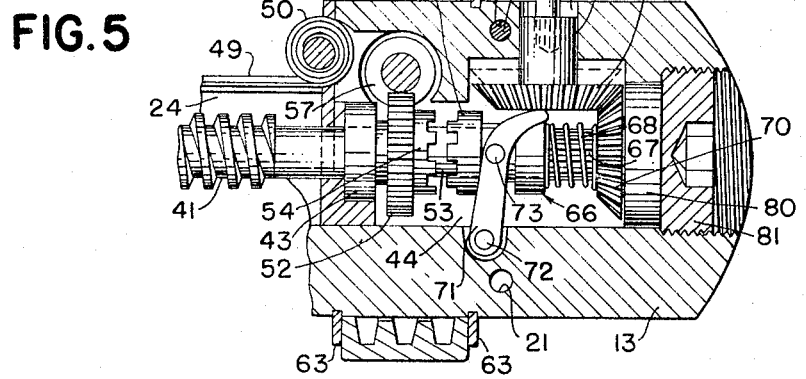
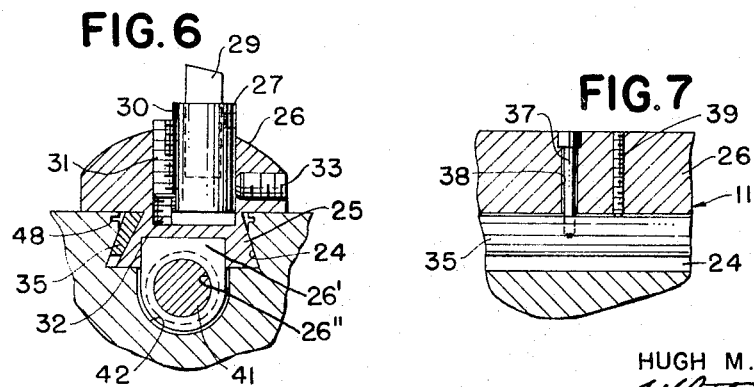
INVENTOR.
HUGH M. FRANKS
BY
ATTORNEYS

United States Patent Office 3,367,217
Patented Feb. 6, 1968

3,367,217
TAPER BORING OR TURNING TOOL UNIT
Hugh M. Franks, 4662 Ziegler, Dearborn Heights, Mich. 48125
Filed Oct. 21, 1965, Ser. No. 499,217
15 Claims. (Cl. 77—57)

ABSTRACT OF THE DISCLOSURE

A boring bar is disclosed for the formation of tapered circular surfaces on a workpiece, which bar includes a relatively massive adapter member having means to rigidly secure the same on a machine tool part. An elongated boring bar body member is pivotally mounted on the adapter member to swing to a selected angular relation to the latter; and means are provided, in laterally spaced relation to the pivotal axis, to clamp the bar member rigidly in an adjusted position, bracing the bar strongly against movement away from that position. Thus, the need for an outboard support for the bar is eliminated in most instances.

The bar member rotatably journals an elongated screw on an axis paralleling the length of the bar member; and this screw mates with the helix of a slide guided for longitudinal movement in opposite directions guided by and along the bar member.

An annular collar surrounds the adapter member, being provided with an internal helix formation, which formation is operatively engaged by an actuator device, for example, a worm and gear unit, the gear part of which is fixedly connected to the screw coaxially thereof. Normally, when the screw is not rotatably driven, the collar rotates with the bar member. However, when a turning or forming operation is desired, the collar is manually held by the opertaor against rotation, with resultant relative movement of the actuator device and collar, so that the helix formation of the collar drives the worm of the actuator device. The worm gear of the device rotates the screw, causing axial movement of the tool-carrying slide.

A more rapid drive of the slide is possible by decoupling the actuator device from the screw, and then driving the screw from the exterior of the adapter member, as through the agency of a bevel gear set, of which one gear is drivingly connected to the screw.

---

The present invention relates to various improvements in a boring bar designed to form tapered circular surfaces, more especially internal, frustoconical surfaces in a relatively massive workpiece. Boring bars for this purpose are known to the art, however, the present invention affords one of great simplicity, coupled with ruggedness and accuracy, and one having improved means for controlling the feed travel of a cutter-mounting slide as the boring bar, proper, describes an arc of progressively changing diameter in forming the tapered workpiece hole.

It is an object of the invention to provide an improved boring bar which comprises the boring bar, proper, having a slide mounting a tool element or cutter for feed traverse movement along the length of the bar, and an improved clevis-type adapter which mounts to a rotary boring head, and has provisions for selectively pivoting a rear body portion of the boring bar on either one of two laterally spaced transverse axes. Thus an operator is enabled to change the operating radius of a cutter on the boring bar slide from a lesser one to a considerably greater one without altering the setting of the cutter, thereby to expand the range of diameters which the boring bar is capable of shaping.

Another object of the invention is to provide boring bar structure as described, in which an elongated boring bar member journals a correspondingly elongated operating helix or screw, and in which a slide mounting a tool element or cutter is guided for longitudinal back and forth movement on and along the boring bar, having means in mating engagement with the screw to effect such movement when the screw is rotated.

In a boring bar of this basic screw-operated type the invention also contemplates improved means for externally shielding the screw (or other type of elongated operating member) from fouling by foreign matter, chips, shavings and the like. As herein described, such protective shielding means takes the form of a pair of spring-biased thin strip metal tapes, the coils of which are mounted for rotation on transverse axes on the boring bar adjacent opposite ends of the latter and the operating member. These tapes are fixedly connected to the tool slide from opposite longitudinal ends of the latter, so that as it takes its back and forth feed and return movements, the tapes are respectively drawn out and retracted on their spring-biased coils, extending over the operating member in shielding relation to the latter.

A still further object is to provide an improved boring bar in which the advance of the tool slide under screw actuation is controlled by the operator in an improved manner from the exterior of the boring bar, by operatively connecting to and disconnecting from the screw an internal driving connection for the screw within the boring bar. As herein illustrated, such connection comprises a worm and worm gear set, in which the gear is fixedly connected to the screw, plus means for causing the worm to rotate or not at the choice of the operator.

Still more specifically, the means last referred to comprises an annular member surrounding the boring bar rearwardly of its operating screw, said annular member having an internal helix engaged by a star element fixed to the control worm.

In this arrangement, the annular member, unless restrained from the exterior, will, along with the driving connection inside the same, rotate with the boring bar, as the latter is driven from a boring head, without rotation of the parts of the screw operating connection, including the star wheel, worm and worm gear components. However, when the annular control member is restrained, partially or wholly, to retard or halt its rotation as mentioned above, its internal helix turns the star wheel and worm, which in turn rotates the worm wheel and screw to advance the cutter slide along the bar, for making the desired tapered cut on a workpiece.

Yet another improvement in accordance with the invention resides in the provision of means whereby a rapid feed or return motion may be imparted to the tool slide, independently of its screw action, and with the operating connection for the latter operatively disabled. As illustrated herein, means are provided to de-clutch the screw from its normally operating drive connection, and then to rotate the screw independently through a drive element fixedly connected coaxially to the latter. Illustratively, such element is a bevel gear splined to a rear extension of the screw, with a mating bevel gear element releasably engageable with the first named element and operable from the exterior of the boring bar body.

The foregoing as well as other objects will become more apparent as this description proceeds, especially when considered in connection with the accompanying drawings illustrating the invention, wherein:

FIG. 4 is a view, in enlarged scale and transverse vertical section at 90° to the boring bar axis, as along line 4—4 of FIG. 2 showing components of the worm and worm gear driving connection for the slide operating screw, and also showing simple means for safely restraining the control helix member against normal rotation with the boring bar, in a way to bring the operating connection into play;

FIG. 5 is a fragmentary view in longitudinal vertical section along line 5—5 of FIG. 4, showing rapid travel or traverse provisions for the screw contemplated by the invention, plus means for externally controlling the latter;

FIG. 6 is a fragmentary, enlarged scale view in transverse vertical section on line 6—6 of FIG. 1, illustrating arrangements for the screw drive of the tool slide along the length of the boring bar;

FIG. 7 is a fragmentary enlarged scale view in vertical section on line 7—7 of FIG. 1 showing simple screw provisions for taking up possible play of the tool slide in a longitudinal way of the boring bar member; and FIG. 8 is a fragmentary view in section on line 8—8 of FIG. 4 of means for releasably holding the control helix member of the boring bar.

Figure 1:
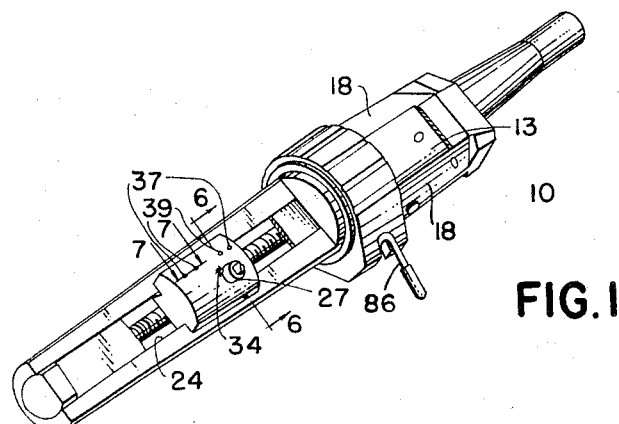
FIG. 1 is a perspective view of the improved boring bar of the invention, with portions of the protective or shield tape on the boring bar member, proper, broken away.
Figure 2:
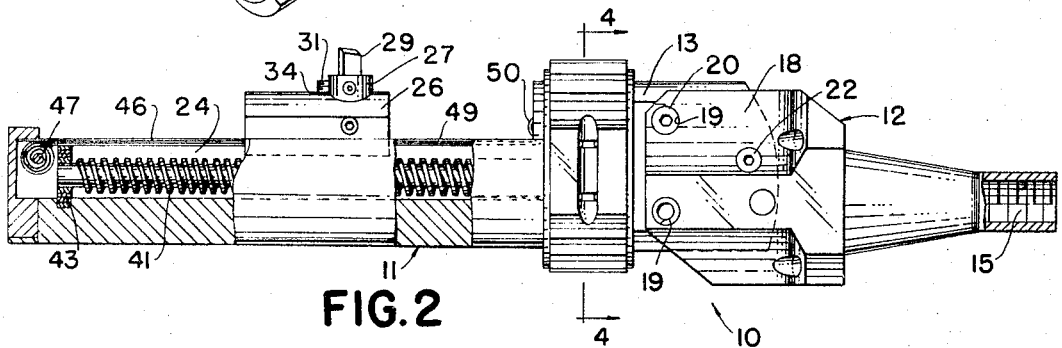
FIG. 2 is a side elevational view, partially broken away and in vertical section through the longitudinal axis of the bar and adapter members of the boring bar, shown in an un-normal straight line relationship (although, indeed, the structure is usable in this relationship for forming cylindrical surfaces)
Figure 3:
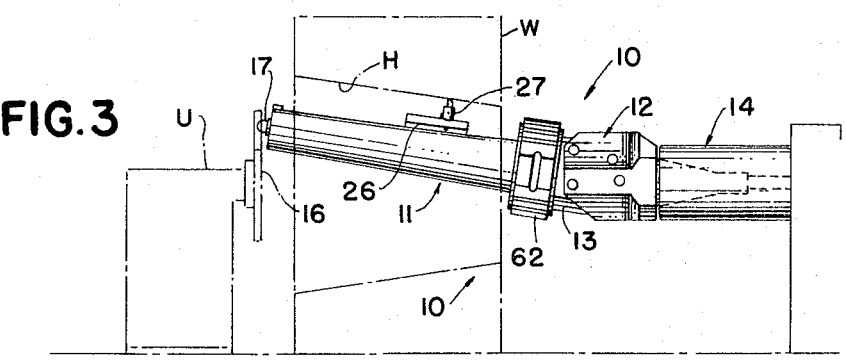
FIG. 3 is a schematic side elevational view illustrating a typical use of the improved boring bar in forming a tapered or frustoconical workpiece opening, also indicat- a means to assist in the operation by stabilizing the swing of the outer extremity of the boring bar member.

Referring first to FIGS. 1, 2 and 3 of the drawings, the boring bar structure 10 of the invention essentially comprises a boring bar body member 11, proper, which is quite massive and elongated in nature; and an adapter 12 in the form of a clevis or equivalent forked member having provision to pivotally mount and clamp a rear, block-like body portion 13 of bar member 11, in a manner to be described. Clevis member 12 has a rearwardly projecting extension receivable within a boring head or spindle 14 (FIG. 3) and may be furnished in various shapes such as frustoconical or cylindrical to fit the boring spindles in which it may be used. The extension may be internally threaded at 15, provided with a tang or otherwise equipped for the completion of the head or spindle connection.

FIG. 3 shows boring bar 10 as typically used in an operation for forming or reaming a frustoconical hole H in a fixedly held workpiece W (dot-dash line); and this operation may be, if desired or felt necessary, assisted by the use of an outboard stabilizing unit U having a radial arm 16 of adjustable length freely rotatable therewith, the arm having a universal ball and socket type of connection or simple clevis to the outer extremity of boring bar 11, as at 17. Such stabilizing provisions will ordinarily be found unnecessary.

In order to increase the range of radii on which the boring bar may operate, while entailing minimum adjustment of its cutter, the forked arms 18 of adapter clevis 12 (FIGS. 1 and 2) are provided with pairs of aligned upper and lower counterbored through-holes 19, one or the other of which pairs receives an Allen head bolt 20 which passes through an upper or lower hole 21 (FIG. 5) extending through the rear block or body portion 13 of boring bar 11, the spacing of holes 21 corresponding to that of the clevis arm hole pairs 19.

Thus, with the bolt 20 applied through the upper set of holes, per FIG. 2, a cutter tool (to be described) on boring bar 11 will, independently of any individual adjustment of the cutter, operate at a given radius from the rotative axis of adapter clevis 12. When the bolt is removed and applied through the other set of holes or openings 19 and 21, such operating radius will be greatly increased, and thus the range of utility of the boring bar is greatly expanded. Suitable clamp bolts 22 are threadedly received in the clevis arms 18 to engage opposite sides of the boring bar body portion 13, thus to hold the bar fixedly and brace it against displacement from any adjusted angular relation of the latter to adapter 12. Of course, dual pivot means of the sort described has utility in various types of taper forming boring bar structure, other than that now to be described in greater detail.

As shown in FIGS. 1, 2, 5 and 6, boring bar member 11 is milled along its length to provide an undercut dovetail slot or way 24, along which an integral mating guide member or tongue formation 25 of a tool slide 26 travels in its feed traverse and return strokes. Referring specially to FIG. 6, the slide 26 is apertured to receive an upright tool holder 27 fixedly but adjustably mounting an appropriate cutter 29. The holder 27 is arcuately recessed at 30 along its cylindrical outer surface; and an adjusting set screw 31 threadedly engages this recess in part, and in its remainder threadedly engages a recess 32 in the holder receiving bore of slide 26. This enables the vertical position of tool holder 27 to be readily and quickly adjusted by manipulation of set screw 31 from above, after which the tool holder is rigidly clamped by a side set screw 33 threaded in slide 26. For the purpose of visually indicating the setting of tool holder 27, the upper surface of the slide may be calibrated at 34 about adjusting screw 31, as indicated in FIGS. 1 and 2.

FIG. 6 also shows a tapered, wedging gib 35 received between the guide tongue 25 of the slide and a wall of the dovetail way 24. Gib 35 is adapted to be adjusted up and down to take up possible play between the tongue and way; and for this purpose (reference being had to FIGS. 1 and 7), a pair of first, headed manipulating screws 37 extend through counterbored upright holes 38 in slide 26 into threaded engagement from above with the gib 35. This enables the gib to be lifted. In order to depress the gib, a pair of set screws 39 are threaded through slide 26 to engage gib 35 from the top.

Referring to FIGS. 1, 2, 5 and 6, an elongated operating helix or screw 41 for slide 26 is journaled at its opposite ends for reception and rotation in an elongated arcuate recess 42 centered directly below and opening upwardly to the slide guide way 24. As shown in FIG. 2, such journal may be in the form of a fixedly mounted ball bearing 43; while the rear of screw 41 may be correspondingly journaled within the forward end of the rear boring bar body portion or block 13, as by an enlarged bearing formation 43, or ball bearing, mounted within a control space 44 of substantial size in portion 13. Rearwardly of the bearing 43, novel provisions (to be described) are made for the drive of screw 41, whether automatically by worm and gear means generally referred to above, or for rapid, hand actuated traverse.

A depending boss 26' fixed on slide 26 has an internal helix 26'' with which screw 41 matingly engages for a longitudinal movement of the slide when the screw is rotated.

In order to shield the considerable length of screw 41 against possible fouling by foreign matter, such as dust, dirt, shavings, chips and the like, the invention contemplates the use of spring-retracted flexible tape means of the type commonly employed in certain weight balancing devices, machinist's steel rules, etc. Referring to FIG. 2, one such tape device, designated 46, includes a spring-biased tape coil 47 mounted on a transverse axis within the longitudinal screw and way recess, immediately forwardly of screw bearing 43. The tape 46 is drawn from this coil to the rear over bearing 43 and fixedly secured to tool slide 26 adjacent the forward end of the latter. This tape portion is of a width to span the guide way 24 beneath the top thereof, and is longitudinally guided in side offset recesses 48 (FIG. 6) adjacent the top of way 24.

Similarly, reference being had to FIGS. 2 and 5, a corresponding tape 49 is spring-biased by a coil 50 inverted relative to forward coil 47 and partially received within the space 44 of the rear boring bar body portion or block 13; and the tape 49 also spans way 24, being fixedly secured to the rear end of tool slide 26.

Thus, the tapes 46, 49 automatically lengthen and retractively shorten as the slide 26 travels way 24, keeping the screw 41, or other equivalent operating means, well protected for a long life of service without cleaning or maintenance.

Reference should now be had to FIGS. 4 and 5, in conjunction with FIG. 2. A worm gear 52 is mounted for free rotation on a rear shaft extension 53 of screw 41 within the body space 44 of the boring bar, the gear 52 being provided with an integral, rearwardly extending clutch dog portion 54; and a mating toothed dog portion 55 directly to the rear (fixedly connected drivingly to shaft extension 53 in a manner to be described) is normally clutch-engaged with dog 54 for the normal tool traversing rotation of screw 41.

Worm gear 52 is meshed from above (FIG. 4) by a small worm 57 journaled by end bearings 58 in a transverse semi-bore recess 59 through bar body 13 above the worm gear. At the left-hand end thereof (FIG. 4) the worm 57 is formed, preferably integrally, to provide a star-shaped actuator 60.

A control sleeve or collar member 62 is mounted for rotation on external arcuate surfaces of the boring bar body portion 13, being axially restrained by snap rings 63 applied to that portion. The annular control member 62 is internally formed to provide a helix 64 of slight pitch but large radius; and the points 65 of the actuator star 60 are, as shown in FIG. 4, adapted to extend into the helix 64.

Thus, when the operator wishes to obtain an automatic screw feed of the tool slide 26 for a cutting stroke along boring bar 11, he retards or stops the rotation of control collar 62 bodily with the boring bar, either by grasping the collar manually, or by using improved safety holding means (to be described). This causes helix 64 to rotate the actuator star member 60 continuously, with attendant rotation of worm 57 and worm gear 52 to drive the screw 41, to which the worm gear is, as mentioned above, clutch-connected by rotating dog 55; and the desired cutting traverse of tool slide 26 ensues.

The improved, manually controlled rapid traverse means of the invention is illustrated in FIG. 5. A peripherally grooved shipper collar 66, on which the screw driving clutch dog 55 is integrally formed, has a sliding splined connection at 67 to the screw shaft extension 53, the shipper being normally urged to the left by a coil compression spring 68, which at its rear or right abuts a bevel gear 70 fixed on the shaft extension 53, for the purpose of rotatively driving screw 41 independently of the worm-worm gear drive connections discussed above.

A shipper arm 71 is pivotally mounted at 72 to the body portion 13 adjacent the latter's internal space 44, the arm having a pin 73 which is radially inwardly received in the annular groove of the clutch dog shipper collar 66; so that when the arm 71 is operated clockwise (FIG. 5) collar 66 is retracted to the rear against the force of spring 68 to de-clutch the worm gear 52, in the position of the parts shown in FIG. 5. As indicated above, this de-couples screw 41 from the normal operating connections therefor.

Shipper arm 71 is operated in this fashion from the exterior of bar portion 13 through the agency of a second bevel gear 75 having a radially outwardly extending, cylindrical hub 76 slidably received in a radial bore 77 through a wall of body portion 13. The hub 76 of bevel gear 75 is provided with an Allen type recess in its radially outer end, which is adapted to receive a goose neck type of operating tool 78 for the manual rotation of bevel gear 75.

Thus, with the tool 78 engaged with the bar, as shown in solid line in FIG. 5, the latter may be inwardly depressed to bring the teeth of bevel gear 75 into mesh with those of the gear 70 fixed on screw shaft extension 53. At the same time, the inner face of bevel gear 75 engages the extremity of shipper arm 71. Consequently, that arm shifts collar 66 to the right (FIG. 5) to de-couple the normal screw operating means; and a rotation of bevel gear 75 by tool 78 drives gear 70 and screw 41 through the splined connection 67. The slide 26 may be given a rapid forward or rearward traverse, when desired; and when bevel gear is allowed to shift outwardly, being thus shifted by arm 71 under the force of spring 68, the clutch dog 55 is returned to the left into driving engagement with the dog 54 on worm gear 52, restoring a normal driving connection.

In order to facilitate the assembly of parts within the boring bar body space 44, the body 13 is provided with a rear opening 80 of sufficient diameter to admit the bevel gears 70, 75 and associated clutch parts, opening 80 being normally covered by a threaded plug 81 or a plain cylindrical plug and internal snap ring. When not in use, the goose neck operating tool 78 is removed from gear hub 76, as suggested in dot-dash line in FIG. 5.

It may be that a direct grasping of the external feed control collar 62 by the operator to provide relative rotation of the collar and body 13 may not be desirable, because of the possibility of injury to the operator. With this in mind, the invention contemplates safety control provisions, whereby collar 62 may be halted or retarded from a distance. As shown in FIG. 4, such means include the formation, on an integral external side boss 83 of collar 62, of a laterally outwardly opening slot 84 (FIGS. 5 and 8) which is of a width to receive a 90° offset shank 85 of an L-shaped control tool 86. Spring urged detent balls 87 received and held in place in small side bores 88 in boss 83 are adapted to engage a pair of annular grooves 89 of tool shank 85. Thus, the tool 86 may be held to the control collar 62 with sufficient firmness enabling the operator to retard or halt the collar; yet, should a reactive rotative force or torque of any significant extent arise, the tool 86 will snap free of the collar, permitting its continued rotation with the boring bar, and an operative disabling of the drive of screw 41. Of course, the tool 86 may ordinarily be withdrawn from collar 62, until the latter is to be controlled as contemplated, or left in place.

It is seen that the invention affords multiple factors of improvement in a boring bar or like tool unit, particularly one for forming tapered surfaces, internally or otherwise. Components are relatively simple and produced by well known manufacturing operations, as well as being sturdy, yet well suited for an accurate machining operation. For these reasons, the boring bar 10 is also adapted for inexpensive manufacture.

What I claim as my invention is:

1. A boring bar device or like tool holder device for forming tapered circular surfaces, comprising an adapter to be fixedly connected to a machine tool part, a boring or equivalent bar having means to connect the same fixedly to said adapter member in selected angular positions about a transverse pivot on said member, said means comprising a pivotal connection of said bar to said member providing said transverse pivot, and means on said member spaced laterally from said pivotal connection to engage and brace the bar rigidly against pivotal movement away from the selected position, an elongated screw journaled on said bar for rotation on an axis lengthwise of the bar, and a cutter mounting slide guided for longitudinal movement on said bar and having means engaging said screw to effect said movement upon rotation of the screw.

2. A boring bar device or like tool holder device for forming tapered circular surfaces, comprising an adapter to be fixedly connected to a machine tool part, a boring or equivalent bar having means to connect the same fixedly to said adapter member in selected angular positions about a transverse pivot on said member, said means comprising a pivotal connection of said bar to said member providing said transverse pivot, and means on said member spaced laterally from said pivotal connection to engage and brace the bar rigidly against pivotal movement away from the selected position, an elongated screw journaled on said bar for rotation on an axis lengthwise of the bar, a cutter mounting slide guided for longitudinal movement on said bar and having means engaging said screw to effect said movement upon rotation of the screw, and means movably mounted on said bar providing a driving connection between the bar and the screw.

3. A boring bar device or like tool holder device for forming tapered circular surfaces, comprising an adapter to be fixedly connected to a machine tool part, a boring or equivalent bar having means to connect the same fixedly to said adapter member in selected angular positions about optional, transversely spaced pivot axes on said member, said means comprising a pivotal connection of said bar to said member providing said transverse pivot, and means on said member spaced laterally from said pivotal connection to engage and brace the bar rigidly against pivotal movement away from the selected position, an elongated screw journaled on said bar for rotation on an axis lengthwise of the bar, a cutter mounting slide guided for longitudinal movement on said bar and having means engaging said screw to effect said movement upon rotation of the screw, and means movably mounted on said bar providing a releasable driving connection between the bar and the screw.

4. A boring bar device or like tool holder device for forming tapered circular surfaces, comprising an adapter to be fixedly connected to a machine tool part, a boring or equivalent bar having means to connect the same fixedly to said adapter member in selected angular positions about a transverse pivot on said member, an elongated screw journaled on said bar for rotation on an axis lengthwise of the bar, a cutter mounting slide guided for longitudinal movement on said bar and having means engaging said screw to effect said movement upon rotation of the screw, and means movably mounted on said bar providing a driving connection between the bar and the screw, said last named means including a member surrounding the bar and having an internal helix formation, and actuator means drivingly connected to said screw and operatively connected to said helix formation to rotate the screw upon relative movement of said helix formation and said actuator means, said member being controllable from the exterior of said bar to optionally engage or disengage said driving connection operatively relative to said screw for the drive or non-drive, respectively, of the slide along the bar.

5. The device of claim 4, in which said actuator means comprises a worm gear in fixed coaxial relation to said screw, and a worm in mated driving engagement with said worm gear, said worm having means engaging said helix formation to rotate the worm to drive said gear and screw, said exteriorly controllable member being in drive controlling engagement at said helix formation with said worm rotating means and being optionally rotatable with the latter about the axis of said bar, said member being exteriorly operable to retard or halt its own rotation about the bar axis and thereby rotate said worm through the rotating means for the worm.

6. A device in accordance with claim 2, in which said bar has means operatively connected to said screw to rotate the screw independently of said driving connection for a relatively rapid travel of said slide along said bar.

7. A device in accordance with claim 4, in which said bar has means operatively connected to said screw to rotate the screw independently of said driving connection for a relatively rapid travel of said slide along said bar.

8. A device in accordance with claim 6, in which said driving connection has means to releasably clutch the same in driving relation to the screw for a slower travel of the slide along the bar.

9. A device in accordance with claim 7, in which said driving connection has means to releasably clutch the same in driving relation to the screw for a slower travel of the slide along the bar.

10. A device in accordance with claim 6, in which said driving connection has means to releasably clutch the same in driving relation to the screw for a slower travel of the slide along the bar, said rapid travel rotation means comprising a first drive element fixedly connected to said screw to rotate the same, and a second drive element operable from the exterior to drive said first element when said operating connection is de-clutched from the screw.

11. A device in accordance with claim 7, in which said driving connection has means to releasably clutch the same in driving relation to the screw for a slower travel of the slide along the bar, said rapid travel rotation means comprising a first drive element fixedly connected to said screw to rotate the same, and a second drive element operable from the exterior to drive said first element when said operating connection is de-clutched from the screw.

12. A device in accordance with claim 7, in which said driving connection has means to releasably clutch the same in driving relation to the screw for a slower travel of the slide along the bar, said rapid travel rotation means comprising a first drive element fixedly connected to said screw to rotate the same, and a second drive element operable from the exterior to drive said first element when said operating connection is de-clutched from the screw, and means enabling said drive elements to be engaged and disengaged with one another for said rapid travel rotation.

13. A boring bar for forming a tapered surface, comprising an adapter member having means to mount the same to a boring head for rotation by the latter and a boring bar member having means to pivotally mount the same on said adapter member for swinging movement to various angular relationships to the adapter member, said last named means comprising means on at least one of said members to afford laterally spaced pivotal axes for the bar member on the adapter member, whereby to position a cutter element on the boring bar member at selective radial distances relative to a workpiece, and means on said adapter member spaced laterally from at least one of said pivotal axes to brace said bar member rigidly against movement away from a selected angular relationship to the adapter member.

14. A boring bar in accordance with claim 13, in which said adapter member is a clevis provided with laterally spaced pairs of transversely aligned openings, said boring bar member having a body portion provided with a transverse opening therethrough, and bolt means extending through one pair of said clevis openings and the opening of said portion for pivoting the boring bar member on the clevis.

15. A boring bar for forming a tapered surface, comprising an adapter member having means to mount the same to a boring head for rotation by the latter, and a boring bar member having means to pivotally mount the same on said adapter member for swinging movement to various angular relationships to the adapter member, said last named means comprising means on one of said members coacting with the other thereof to afford a pivotal connection of the bar member on the adapter member, whereby to position a cutter element on the boring bar member at selective radial distances relative to a workpiece, and means on said adapter member spaced laterally from said pivotal connection to brace said bar member rigidly against movement away from a selected angular relationship to the adapter member.

(References on following page)

References Cited

UNITED STATES PATENTS

| | | | |
|---|---|---|---|
| 200,071 | 2/1878 | Love | 77—57 |
| 1,436,522 | 11/1922 | Pedrick | 77—57 |
| 1,679,912 | 8/1928 | Mondloch | 51—268 |
| 2,638,802 | 5/1953 | Froussard | 77—57 |
| 2,785,262 | 3/1957 | Bourns | 308—3.5 |
| 3,134,996 | 6/1964 | Retz | 77—34.7 |

GERALD A. DOST, *Primary Examiner.*